(12) United States Patent
Sugimoto et al.

(10) Patent No.: US 12,054,053 B2
(45) Date of Patent: Aug. 6, 2024

(54) SERVER, CHARGING SYSTEM, AND COMPUTER READABLE RECORDING MEDIUM

(71) Applicant: TOYOTA JIDOSHA KABUSHIKI KAISHA, Toyota (JP)

(72) Inventors: Kazuhiro Sugimoto, Ashigarakami-gun (JP); Kotoru Sato, Susono (JP); Kumiko Katsumata, Susono (JP); Shun Ota, Susono (JP); Takahiro Suzuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 356 days.

(21) Appl. No.: 17/518,638

(22) Filed: Nov. 4, 2021

(65) Prior Publication Data
US 2022/0169120 A1 Jun. 2, 2022

(30) Foreign Application Priority Data

Dec. 1, 2020 (JP) .................... 2020-199871

(51) Int. Cl.
| | | |
|---|---|---|
| *B60L 15/20* | (2006.01) | |
| *B60L 58/12* | (2019.01) | |
| *B60L 58/18* | (2019.01) | |
| *B60W 40/08* | (2012.01) | |
| *G07C 5/00* | (2006.01) | |
| *H04L 67/12* | (2022.01) | |

(52) U.S. Cl.
CPC ............. *B60L 15/20* (2013.01); *B60L 58/12* (2019.02); *B60L 58/18* (2019.02); *B60W 40/08* (2013.01); *G07C 5/008* (2013.01); *B60L 2240/662* (2013.01); *B60L 2250/00* (2013.01); *B60W 2540/221* (2020.02); *H04L 67/12* (2013.01)

(58) Field of Classification Search
CPC .......... B60L 15/20; B60L 58/18; B60L 58/12; B60L 2240/662; B60L 2250/00; B60W 40/08; B60W 2540/221; G07C 5/008; H04L 67/12
See application file for complete search history.

(56) References Cited

U.S. PATENT DOCUMENTS

| | | | |
|---|---|---|---|
| 8,996,213 B2 | 3/2015 | Ishikawa et al. | |
| 2017/0361730 A1* | 12/2017 | Hiramitsu | ............... B60L 53/00 |

FOREIGN PATENT DOCUMENTS

| | | | | |
|---|---|---|---|---|
| JP | 2004-236472 A | 8/2004 | | |
| JP | 2013-070515 A | 4/2013 | | |
| JP | 2020-078963 A | 5/2020 | | |
| WO | WO-2018145965 A1 * | 8/2018 | ........... | A61B 5/0077 |
| WO | WO-2021091543 A1 * | 5/2021 | ............. | B60K 6/387 |

* cited by examiner

*Primary Examiner* — Michael D Lang
(74) *Attorney, Agent, or Firm* — Finnegan, Henderson, Farabow, Garrett & Dunner, LLP (57) ABSTRACT

A server includes a processor configured to: acquire a starting position where a user starts to use a moving object including a rechargeable secondary battery, and a destination of the user; estimate a power amount for the moving object to move from the starting position to the destination; determine whether or not power of the secondary battery is consumed at the destination; increase the power amount when the power of the secondary battery is consumed at the destination; and charge the moving object to the power amount.

3 Claims, 6 Drawing Sheets

SERVER, CHARGING SYSTEM, AND COMPUTER READABLE RECORDING MEDIUM

The present application claims priority to and incorporates by reference the entire contents of Japanese Patent Application No. 2020-199871 filed in Japan on Dec. 1, 2020.

BACKGROUND

The present disclosure relates to a server, a charging system, and a computer readable recording medium.

There is known a technique of estimating an amount of power required for arriving at a destination designated by a user based on travel history data and a scheduled travel route to the destination and controlling charging of a battery of an electric vehicle based on the required power amount. The travel history data includes types of a large number of electric vehicles, travel routes where the electric vehicles actually travel, and amounts of power consumption in the travel routes.

SUMMARY

In the known technique, power consumption caused by an action of a user is not considered. When the user heavily uses an air conditioner, increased power consumption may cause the state of charge (SOC) shortage of a battery of a moving object.

There is a need for a server, a charging system, and a computer readable recording medium that are able to prevent the SOC shortage of a battery of a moving object in consideration of power consumption accompanying an action of a user.

According to one aspect of the present disclosure, there is provided a server including a processor configured to: acquire a starting position where a user starts to use a moving object including a rechargeable secondary battery, and a destination of the user; estimate a power amount for the moving object to move from the starting position to the destination; determine whether or not power of the secondary battery is consumed at the destination; increase the power amount when the power of the secondary battery is consumed at the destination; and charge the moving object to the power amount.

DETAILED DESCRIPTION

Hereinafter, a charging system according to an embodiment of the present disclosure will be described with reference to the drawings. Note that the present disclosure is not limited by the following embodiment. Furthermore, in the following description, the same sign is attached to the same part.

Figure 1:
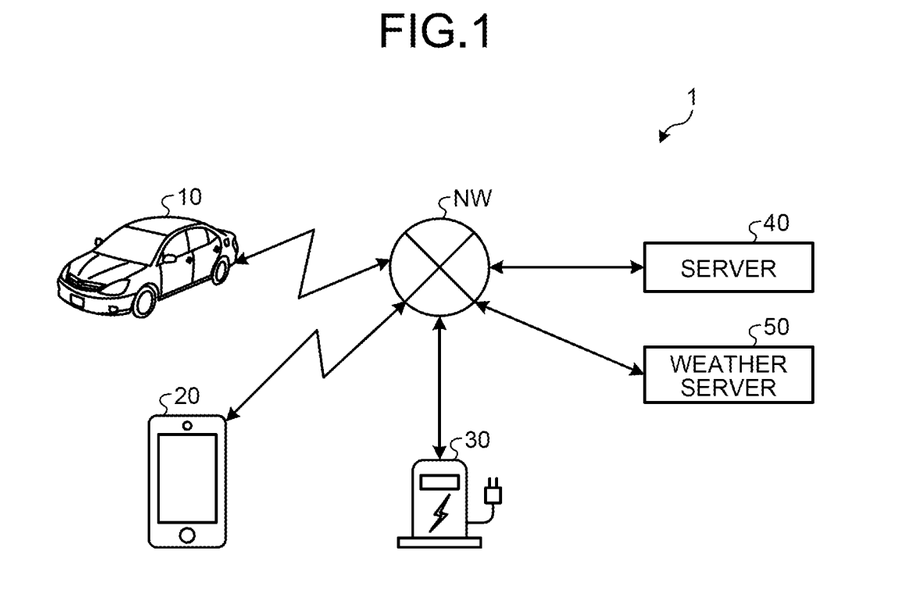
FIG. 1 schematically illustrates the configuration of a charging system according to an embodiment.

FIG. 1 schematically illustrates the configuration of a mobile system according to the embodiment. A charging system 1 in FIG. 1 includes a moving object 10, a communication terminal 20, a charging device 30, a server 40, and a weather server 50. The weather server 50 stores weather forecasts predicted for each predetermined area. The charging system 1 may communicate with each other over a network NW. The network NW includes, for example, an internet network and a mobile phone network.

Figure 2:
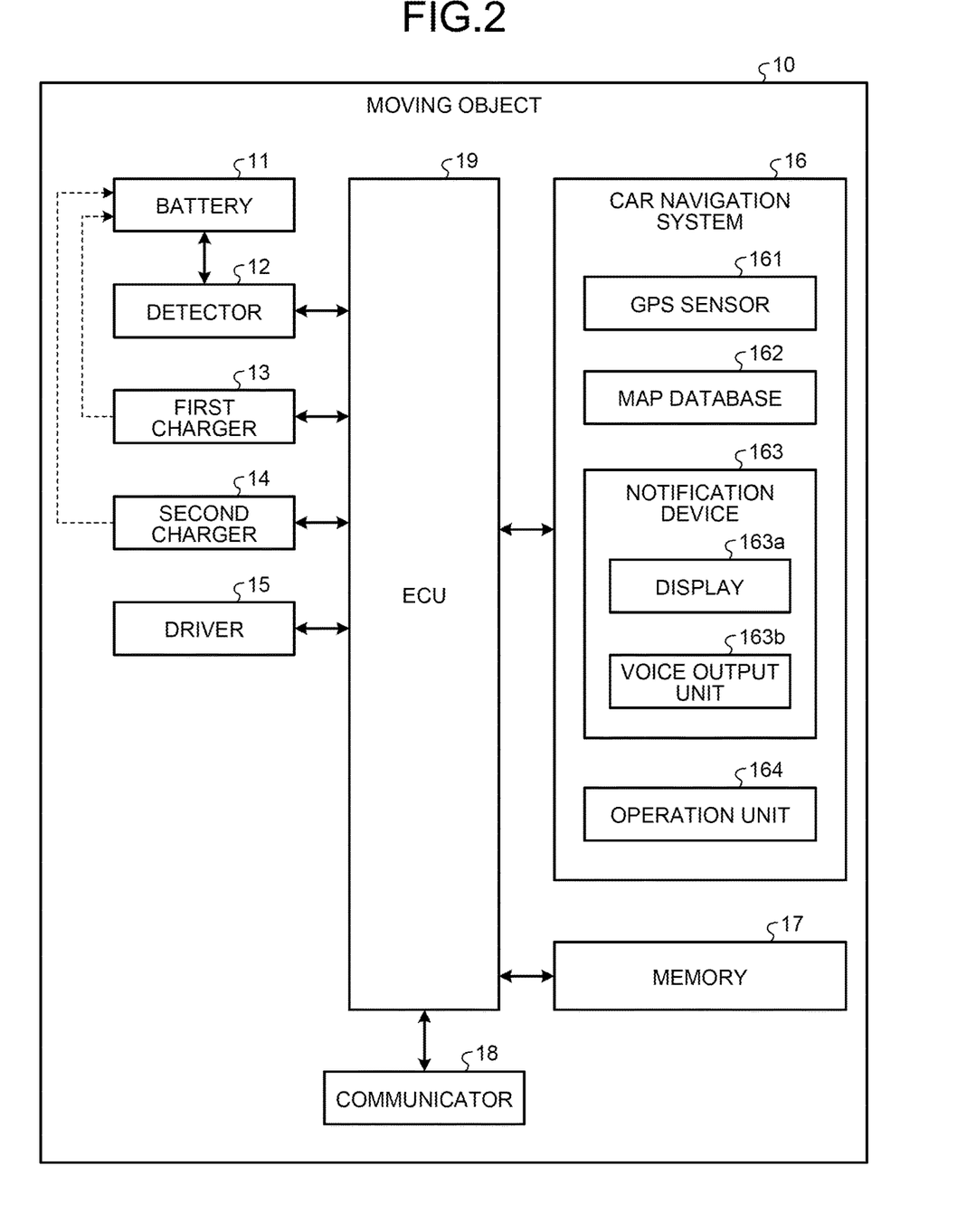
FIG. 2 is a block diagram illustrating the functional configuration of a moving object according to the embodiment.

First, the functional configuration of the moving object 10 will be described. FIG. 2 is a block diagram illustrating the functional configuration of the moving object 10.

The moving object 10 in FIG. 2 includes a battery 11, a detector 12, a first charger 13, a second charger 14, a driver 15, a car navigation system 16, a memory 17, a communicator 18, and an electronic control unit (ECU) 19. Furthermore, although an automobile such as a battery electric vehicle (BEV), a plug-in hybrid electric vehicle (PHEV), and a fuel cell electric vehicle (FCEV) will be described as the moving object 10 below, these are not limitations. For example, an electric bicycle such as a motorcycle, a bicycle, and a scooter including a motor and a battery, a tricycle, a bus, a truck, a ship, and a drone may also be applied. Moreover, the moving object 10 may automatically move toward a destination under the control of the server 40 or the ECU 19. Of course, the moving object 10 may move toward the destination desired by a user who uses or boards the moving object 10 by the user operating a steering and the like.

The battery 11 includes a rechargeable secondary battery such as a nickel-hydrogen battery and a lithium-ion battery. The battery 11 stores high-voltage direct-current power for driving the moving object 10.

The detector 12 detects each of the state of charge (Sac), the temperature, the state of health (SOH), the voltage value, and the current value of the battery 11, and outputs the detection result to the ECU 19. The detector 12 includes various battery sensors, temperature sensors, and the like.

The first charger 13 is electrically connected to the battery 11, and may be electrically connected to the charging device 30 via a charging port. The first charger 13 converts (transforms) external power (direct-current power) supplied from the charging device 30 into voltage and power that may be charged to the battery 11, and outputs the converted voltage and power (power supply in usual charging method). The first charger 13 includes an AC/DC converter, a DC/DC converter, and the like.

The second charger 14 is electrically connected to the battery 11, and may be electrically connected to the charging device 30 via a charging port. The second charger 14 converts (transforms) direct current supplied from the charging device 30 (power supply in rapid charging method using DC charging) into voltage and power that may be charged to the battery 11, and outputs the converted voltage and power. The first charger 13 includes a DC/DC converter, a rectifier circuit, and the like.

The driver 15 supplies driving force to a driving wheel of the moving object 10 based on the power supplied from the battery 11 under the control of the ECU 19. The driver 15 includes a motor and the like.

The car navigation system 16 includes a global positioning system (GPS) sensor 161, a map database 162, a notification device 163, and an operation unit 164.

The GPS sensor 161 receives a signal from a plurality of GPS satellites or transmission antennas, and calculates the position (longitude and latitude) of the moving object 10 based on the received signal. The GPS sensor 161 includes a GPS reception sensor and the like. Note that, in the embodiment, the orientation accuracy of the moving object 10 may be improved by mounting a plurality of GPS sensors 161.

The map database 162 stores various pieces of map data. The map database 162 includes a recording medium such as a hard disk drive (HDD) and a solid state drive (SSD).

The notification device 163 includes a display 163a and a voice output unit 163b. The display 163a displays an image, a map, a video, and character information. The voice output unit 163b generates sound such as voice and warning sound. The display 163a includes a display device using a liquid crystal, organic electro luminescence (EL), and the like. The voice output unit 163b includes a speaker and the like.

The operation unit 164 receives inputs of user operations, and outputs signals in accordance with the received various operation contents to the ECU 19. The operation unit 164 includes a touch panel, a button, a switch, a jog dial, and the like.

The car navigation system 16 configured as described above superimposes the current position of the moving object 10 acquired by the GPS sensor 161 on a map corresponding to map data stored in the map database 162, thereby notifying the user of information including a road on which the moving object 10 is currently traveling, a route to a destination, and the like with the display 163a and the voice output unit 163b.

The memory 17 stores various pieces of information on the moving object 10. The memory 17 stores CAN data on the moving object 10 input from the ECU 19, various programs executed by the ECU 19, and the like. The memory 17 includes a dynamic random access memory (DRAM), a read only memory (ROM), a flash memory, a hard disk drive (HDD), a solid state drive (SSD), and the like.

The communicator 18 transmits CAN data and the like to the server 40 over the network NW under the control of the ECU 19. Here, the CAN data includes the state of charge (SOC), the SOH, and the like of the battery 11. The communicator 18 includes a communication module or the like capable of transmitting/receiving various pieces of information.

The ECU 19 includes a memory and a processor having hardware such as a central processing unit (CPU). The ECU 19 controls each unit of the moving object 10. The ECU 19 moves the moving object 10 to the charging device 30 or a predetermined place by controlling the driver 15 in accordance with a signal and an instruction transmitted from the server 40 via the communicator 18, the position of the moving object 10 detected by the car navigation system 16, and the like.

Figure 3:
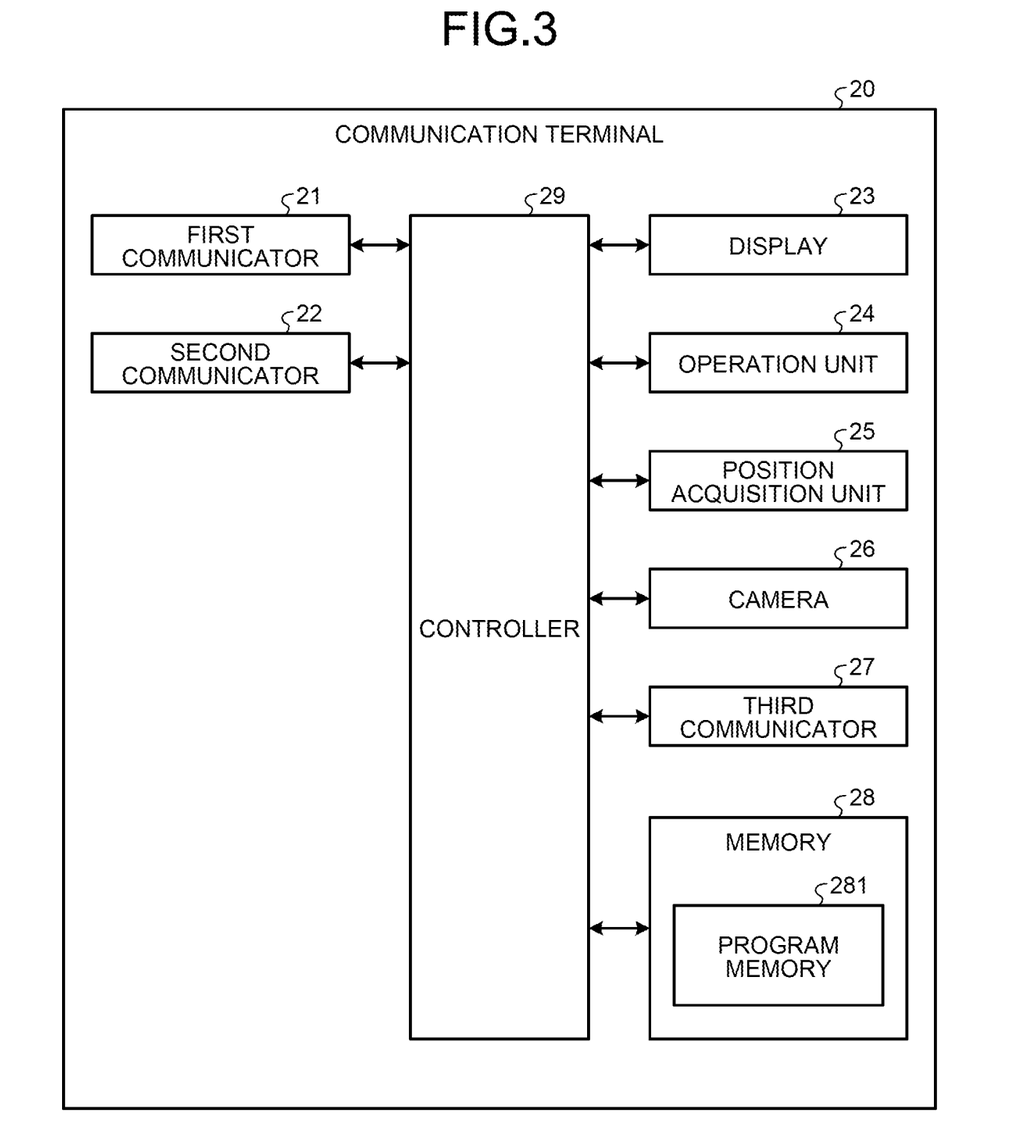
FIG. 3 is a block diagram illustrating the functional configuration of a communication terminal according to the embodiment.

Next, the functional configuration of the communication terminal 20 will be described. FIG. 3 is a block diagram illustrating the functional configuration of the communication terminal 20.

The communication terminal 20 in FIG. 3 includes a first communicator 21, a second communicator 22, a display 23, an operation unit 24, a position acquisition unit 25, a camera 26, a third communicator 27, a memory 28, and a controller 29. Note that, although the communication terminal 20 will be described below as a mobile phone, the communication terminal 20 is not limited to the mobile phone. For example, a tablet terminal, a wearable device, and the like may be applied. Here, examples of the wearable device include a watch, an activity meter, and the like including a sensor, a communication module, and the like. The sensor may detect biological information on a user who wears the wearable device. The communication module may communicate with the outside. Furthermore, the biological information includes a body weight, a blood pressure, a pulse, a blood glucose level, a cholesterol level, a blood oxygen concentration, a body temperature, and the like.

The first communicator 21 receives various pieces of information from the moving object 10 or the wearable device under the control of the controller 29, and outputs the received various pieces of information to the controller 29. The first communicator 21 includes a communication module capable of performing, for example, Bluetooth (registered trademark) and the like.

The second communicator 22 receives various pieces of information from the moving object 10 or the wearable device under the control of the controller 29, and outputs the received various pieces of information to the controller 29. The second communicator 22 includes a communication module capable of performing Wi-Fi (registered trademark) and the like.

The display 23 displays various pieces of information under the control of the controller 29. The display 23 includes a display panel using a liquid crystal, organic electro luminescence (EL), and the like.

The operation unit 24 receives inputs of various user operations, and outputs signals corresponding to the received various operations to the controller 29. The operation unit 24 includes a touch panel, a switch, a button, and the like.

The position acquisition unit 25 acquires the position of the communication terminal 20, and outputs the acquired position to the controller 29. The position acquisition unit 25 is implemented by using a plurality of GPS reception sensors and the like.

The camera 26 generates image data by imaging a subject under the control of the controller 29, and outputs the image data to the controller 29. The camera 26 is implemented by using one or a plurality of optical systems and an image sensor of a charge coupled device (CCD) or a complementary metal oxide semiconductor (CMOS), which generate image data by capturing a subject image formed by the optical systems.

The third communicator 27 communicates with the server 40 via the network NW under the control of the controller 29, and transmits destination information on a destination set by a user via the operation unit 24. The third communicator 27 includes a communication module capable of performing a communication standard based on a mobile phone line, for example, a fourth-generation mobile communication system (4G), a fifth-generation mobile communication system (5G), and the like.

The memory 28 stores various pieces of information on the communication terminal 20 and various programs executed by the communication terminal 20. The memory 28 is implemented by using a DRAM, a ROM, a flash memory, an SSD, a memory card, and the like.

The controller 29 includes a memory and a processor having hardware such as a CPU. The controller 29 controls each unit of the communication terminal 20.

Figure 4:
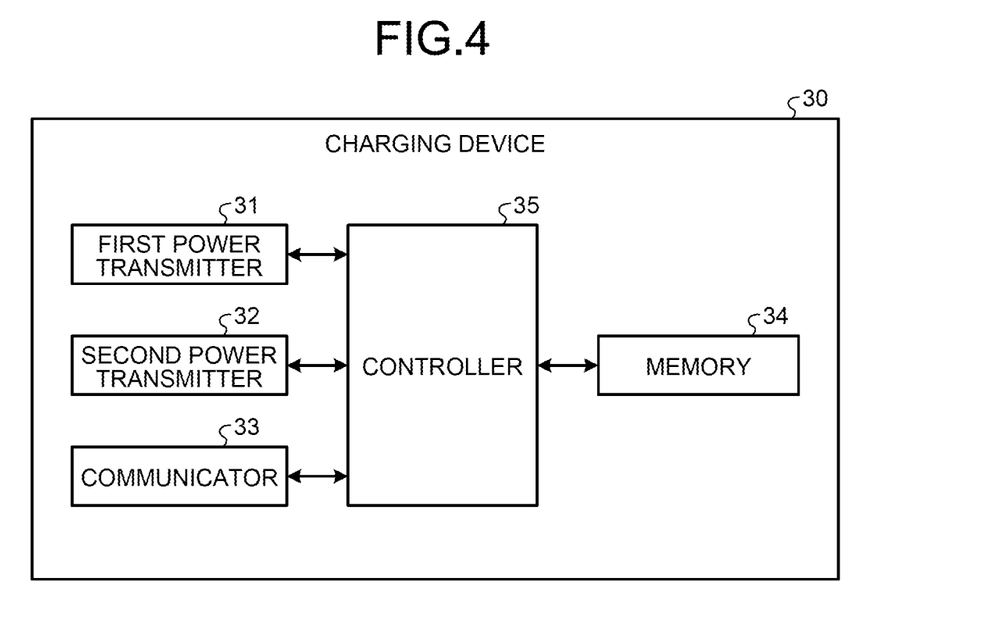
FIG. 4 is a block diagram illustrating the functional configuration of a charging device according to the embodiment.

Next, the functional configuration of the charging device 30 will be described. FIG. 4 is a block diagram illustrating the functional configuration of the charging device 30.

The charging device 30 in FIG. 4 includes a first power transmitter 31, a second power transmitter 32, a communicator 33, a memory 34, and a controller 35.

The first charger 13 of the moving object 10 is connected to the first power transmitter 31. The first power transmitter 31 converts alternating current of a predetermined voltage value (e.g., 6600 V) supplied from an external alternating current power source into direct current of a predetermined value (e.g., 200 V), and thereby supplies the converted current to the first charger 13 (usual charging). The first power transmitter 31 includes a connector connectable to the first charger 13 of the moving object 10, a cable that transfers power to the connector, an AC/DC converter, an inverter, a rectifier circuit, a transformer, a circuit breaker, and the like. Note that the first power transmitter 31 may supply power in a non-contact manner (wireless AC charging). In the case, either of a magnetic field coupling method or an electric field coupling method may be adopted as a power supply method.

The second power transmitter 32 converts alternating current of a predetermined voltage value (e.g., 6600 V) supplied from an external alternating current power source into direct current of a predetermined voltage value (e.g., 500 V), and thereby supplies the converted current to the second charger (rapid charging). The second power transmitter 32 includes a connector connectable to the second charger 14 of the moving object 10, a cable that transfers power to the connector, an AC/DC converter, an inverter, a rectifier circuit, a transformer, a circuit breaker, and the like.

The communicator 33 communicates with the moving object 10, the communication terminal 20, and the server 40 over the network NW, and transmits/receives various pieces of information under the control of the controller 35. The communicator 33 includes a communication module and the like.

The memory 34 stores various pieces of information on the charging device 30. The memory 34 includes a DRAM, a ROM, a flash memory, an SSD, and the like.

The controller 35 includes a memory and a processor having hardware such as a CPU. The controller 35 controls each unit of the charging device 30.

Figure 5:
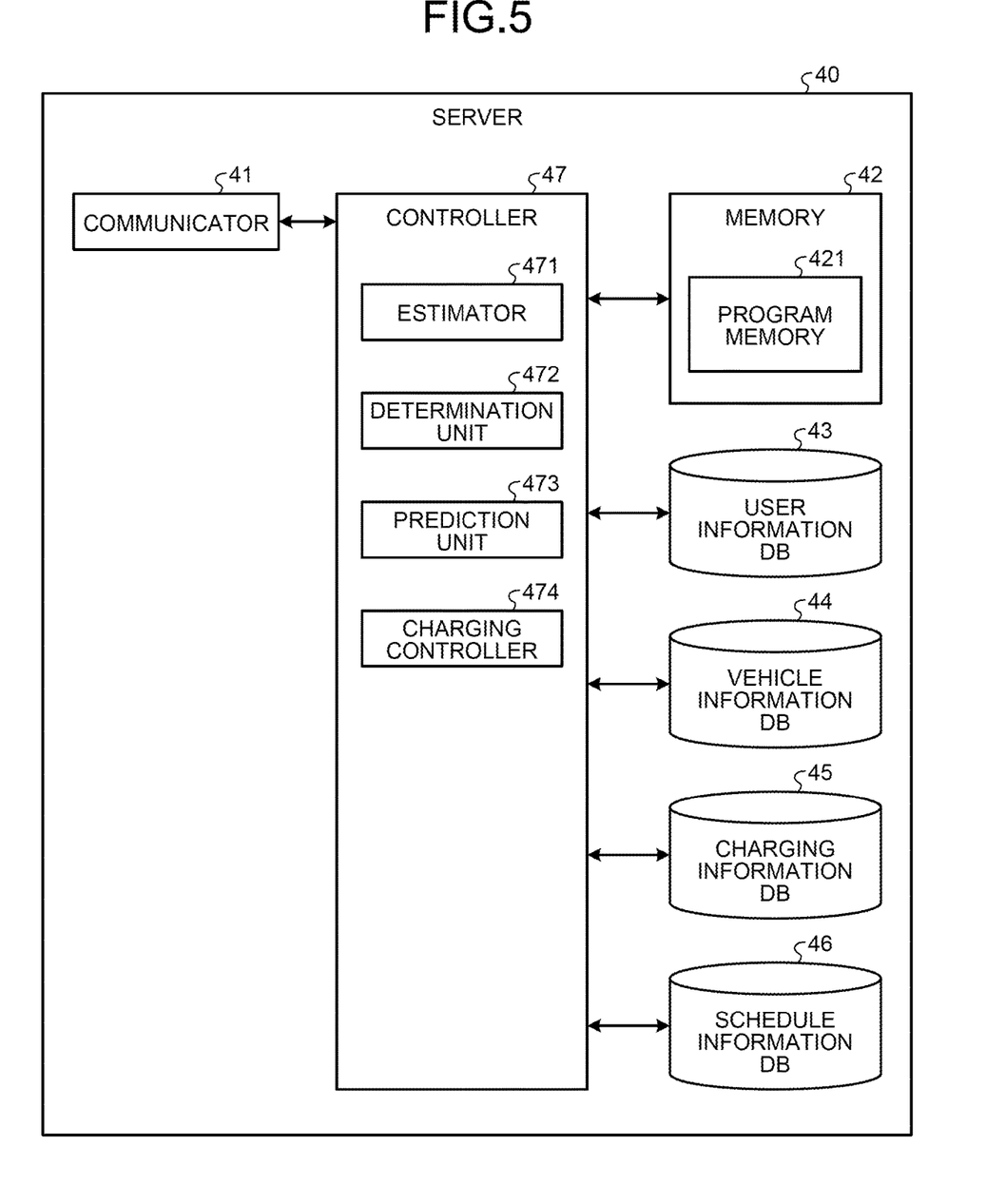
FIG. 5 is a block diagram illustrating the functional configuration of a server according to the embodiment.

Next, the functional configuration of the server 40 will be described. FIG. 5 is a block diagram illustrating the functional configuration of the server 40.

The server 40 in FIG. 5 includes a communicator 41, a memory 42, a user information database 43 (hereinafter, referred to as "user information DB 43"), a vehicle information database 44 (hereinafter, referred to as "vehicle information DB 44"), a charging information database 45 (hereinafter, referred to as "charging information DB 45"), a schedule information database 46 (hereinafter, referred to as "schedule information DB 46"), and a controller 47.

The communicator 41 communicates with the moving object 10, the communication terminal 20, and the charging device 30 via the network NW under the control of the controller 47. The communicator 41 includes a communication module and the like.

The memory 42 stores various pieces of information on the server 40. Furthermore, the memory 42 includes a program memory 421 that stores various programs executed by the server 40. The memory 42 is implemented by using a DRAM, a ROM, a flash memory, an SSD, an HDD, a memory card, and the like.

The user information DB 43 stores user information. In the user information, terminal information for identifying the communication terminal 20 held by the user and user identification information for identifying the user are associated with each other. Here, the terminal information includes a device address, a telephone number, an e-mail address, and the like. Furthermore, the user identification information includes a name, an address, a birth date of a user, and an action history of the user based on information on the position of the communication terminal 20 of the user, and the like. Note that the action history may include a purchase history and the like of the user based on electronic money registered in the communication terminal 20 of the user. The user information DB 43 includes an HDD, an SSD, and the like.

The vehicle information DB 44 stores vehicle information. In the vehicle information, vehicle identification information for identifying the moving object 10, information on the current state of the moving object 10, and information on the current position of the moving object 10 are associated with each other. The vehicle identification information includes the vehicle type name, the model year, the owner, and the like of the moving object 10. Furthermore, the state information includes the state of charge of the battery 11 of the moving object 10, CAN data, and the like. The vehicle information DB 44 includes an HDD, an SSD, and the like.

The charging information DB 45 stores charging information. In the charging information, charging identification information for identifying the charging device 30, charging status information indicating the current charging status of the charging device 30, and installation information indicating an installation place of the charging device 30 are associated with each other. The charging identification information includes a method of charging (e.g., usual charging method (single-phase AC 200 V or 100 V) or rapid charging method) the charging device 30, the shape of a charging connector, a device address, and the like. The charging status information includes whether or not the moving object 10 is currently charged by the charging device 30, the scheduled completion time of charging of the battery 11 of the moving object 10, the charging status of the battery of the moving object 10, and the like. The charging information DB 45 includes an HDD, an SSD, and the like.

The schedule information DB 46 stores schedule information. In the schedule information, terminal information for identifying the communication terminal 20 held by a user, user identification information for identifying the user, and a user schedule input by the user are associated with each other. Here, the user schedule includes a position where the moving object 10 is scheduled to be used, a destination of the user, a scheduled use time of the moving object 10 of the user, a starting position of the moving object 10 of the user, a date and time when the user uses the moving object 10, vehicle identification information on the moving object 10 used by the user, presence or absence of a going out schedule of the user, an action schedule (e.g., schedule of running) of the user, and the like. The schedule information DB 46 includes an HDD, an SSD, and the like.

The controller 47 includes a memory and a processor having hardware such as a CPU, a field-programmable gate array (FPGA), and a graphics processing unit (GPU). The controller 47 controls each unit of the server 40. The controller 47 includes an estimator 471, a determination unit 472, a prediction unit 473, and a charging controller 474. Note that, in the embodiment, the controller 47 functions as a processor.

The estimator 471 acquires a starting position where the user starts to use the moving object 10 and a destination of the user. Specifically, the estimator 471 acquires a destination set by the user in the communication terminal 20 or the car navigation system 16 of the moving object 10 via the communicator 41. Moreover, the estimator 471 acquires a starting position input by the user operating the communication terminal 20, or acquires a starting position from the schedule information DE 46 via the communicator 41. Then, the estimator 471 estimates an amount of power required from the starting position of the moving object 10 of the user to a destination of the user. Specifically, the estimator 471 may read a learned model stored in the program memory 421, input the destination of the user and the starting position as input data in the read learned model, and output the required power amount as output data. The learned model is formed by using a deep neural network (DNN) as machine learning, for example. Note that any type of network of DNN may be adopted as long as the estimator 471 may use the type. Specifically, the type of machine learning is not particularly limited. For example, it is sufficient if a type of machine learning is adopted. In the type, teacher data and learning data are provided. In the data, a distance and an amount of required power are associated. Learning is performed by inputting the teacher data and the learning data to a calculation model based on a multilayer neural network. Moreover, a method based on a DNN of a multilayer neural network such as a convolutional neural network (CNN) and a 3D-CNN may be used as a method of machine learning.

The determination unit 472 determines whether or not the user consumes power of the battery 11 of the moving object 10 at the destination. Specifically, when the destination of the user is at least one of outdoor facilities and sports facilities, the determination unit 472 determines that the user consumes the power of the battery 11 of the moving object 10 at the destination. Furthermore, the determination unit 472 determines whether or not the destination of the user satisfies a predetermined condition based on a weather forecast acquired by the estimator 471. Here, the predetermined condition includes a temperature at which the user uses an air conditioner, for example, a temperature of 25 degrees or more. Furthermore, the determination unit 472 determines whether or not the user biological information is within the range of the action prediction predicted by the later-described prediction unit 473. Specifically, when the heart rate in the user biological information is within the range of the action prediction predicted by the prediction unit 473, for example, when the user action prediction predicted by the later-described prediction unit 473 is running, the determination unit 472 determines whether or not the heart rate is within 80 to 140 beat per minutes (bpm).

The prediction unit 473 makes a user action prediction. Specifically, the prediction unit 473 acquires user schedule information from the schedule information DB 46, and makes a user action prediction based on the user schedule information. Specifically, when exercise is noted in a user schedule, for example, when running is noted in the schedule, the prediction unit 473 makes an action prediction that the user will run in sports facilities of the destination of the user.

When the destination satisfies a predetermined condition, the charging controller 474 sets a required power amount to be higher than a required power amount estimated by the estimator 471. Specifically, the charging controller 474 sets a required amount of power to be charged to the battery 11 of the moving object 10 to be higher than the required power amount estimated by the estimator 471 as the air temperature at the destination is increased based on the weather forecast. For example, as the air temperature at the destination based on the weather forecast is increased by one degree from a predetermined value (25 degrees), the charging controller 474 sets the required power amount to be higher than the required power amount estimated by the estimator 471 by 5%. Furthermore, the charging controller 474 sets the required amount of power to be charged to the battery 11 of the moving object 10 to be higher than the required power amount estimated by the estimator 471 in Step S103. For example, the charging controller 474 sets the required power amount to be 10% higher than the required power amount estimated by the estimator 471.

Figure 6:
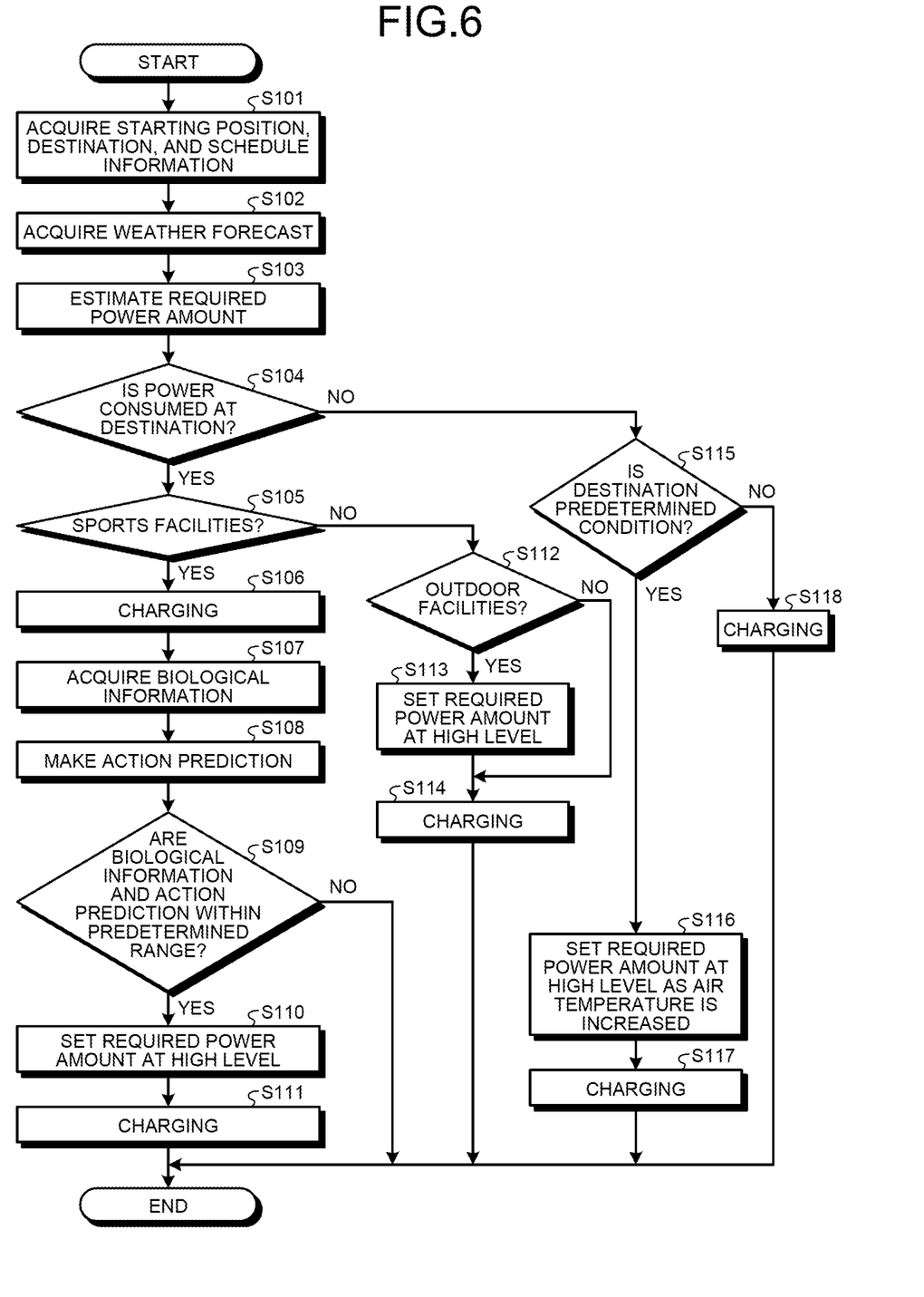
FIG. 6 is a flowchart outlining processing executed by the server according to the embodiment.

Next, processing executed by the server 40 will be described. FIG. 6 is a flowchart outlining processing executed by the server 40.

As illustrated in FIG. 6, first, the estimator 471 acquires a starting position, a destination, and schedule information of a user (Step S101). Specifically, the estimator 471 acquires the starting position, the destination, and the schedule information of the user from the schedule information DB 46. Note that the estimator 471 may acquire the starting position, the destination, and the schedule information of the user input by the user operating the communication terminal 20 from the communication terminal 20 of the user via the communicator 41.

Subsequently, the estimator 471 acquires weather information on a predetermined region including the destination of the user from the weather server 50 via the communicator 41 (Step S102). For example, the estimator 471 acquires weather information on a region of 10 km×10 km including the destination of the user as the center from the weather server 50.

Subsequently, the estimator 471 estimates an amount of power required by the moving object 10 based on the starting position of the user and the destination of the user (Step S103). Specifically, the estimator 471 estimates the amount of power required by the moving object 10 based on the distance from the starting position of the user to the destination of the user.

Thereafter, the determination unit 472 determines whether or not the user consumes power of the battery 11 of the moving object 10 at the destination (Step S104). Specifically, when the destination of the user is at least one of outdoor facilities and sports facilities, the determination unit 472 determines that the user consumes the power of the battery 11 of the moving object 10 at the destination. This is because, when the destination of the user is outdoor facilities, it is assumed that the user uses another electric device by using the power charged in the battery 11 of the moving object 10, and when the destination of the user is a sports facilities, it is assumed that an air conditioning device of the moving object 10 is used to lower the temperature in the vehicle interior of the moving object 10 after the user exercises. In contrast, when the destination of the user is not outdoor facilities and sports facilities, the determination unit 472 determines that the user does not consume the Power of the battery 11 of the moving object 10 at the destination. When the determination unit 472 determines that the user consumes power of the battery 11 of the moving object 10 at the destination (Step S104: Yes), the server 40 proceeds to Step S105 described later. In contrast, when the determination unit 472 determines that the user does not consume the power of the battery 11 of the moving object 10 at the destination (Step S104: No), the server 40 proceeds to Step S115 described later.

In Step S105, the determination unit 472 determines whether or not the destination of the user is sports facilities. When the determination unit 472 determines that the destination of the user is sports facilities (Step S105: Yes), the server 40 proceeds to Step S106 described later. In contrast, when the determination unit 472 determines that the destination of the user is not sports facilities (Step S105: No), the server 40 proceeds to Step S112 described later.

In Step S106, the charging controller 474 charges the moving object 10 used by the user by controlling the charging device 30 via the communicator 41.

Subsequently, the prediction unit 473 acquires the user biological information via the communicator 41 and the communication terminal 20 (Step S107). Specifically, the prediction unit 473 acquires user biological information detected by a wearable device, which is wirelessly connected to the communication terminal 20 and worn by the user, via the communicator 41 and the communication terminal 20.

Subsequently, the prediction unit 473 makes a user action prediction based on the user schedule information (Step S108). Specifically, when exercise is noted in a user schedule, for example, when running is noted in the schedule, the prediction unit 473 makes an action prediction that the user will run in sports facilities of the destination of the user.

Thereafter, the determination unit 472 determines whether or not the user biological information is within the range of the action prediction predicted by the prediction unit 473 (Step S109). Specifically, when the heart rate in the user biological information is within the range of the action prediction predicted by the prediction unit 473, for example, when the action prediction is running, the determination unit 472 determines whether or not the heart rate is within 80 to 140 bpm. The reason is to prevent unnecessary charging to the moving object 10 by determining whether or not the predicted action based on the actual schedule of the user has been performed. When the determination unit 472 determines that the user biological information is within the range of the action prediction predicted by the prediction unit 473 (Step S109: Yes), the server 40 proceeds to Step S110 described later. In contrast, when the determination unit 472 determines that the user biological information is not within the range of the action prediction predicted by the prediction unit 473 (Step S109: No), the server 40 ends the processing.

In Step S110, the charging controller 474 sets the required amount of power to be charged to the battery 11 of the moving object 10 to be higher than the required power amount estimated by the estimator 471 in Step S103. For example, the charging controller 474 sets the required power amount to be 10% higher than the required power amount estimated by the estimator 471.

Subsequently, the charging controller 474 charges the moving object 10 by controlling the charging device 30 such that the required power amount set in Step S110 is achieved (Step S111). As a result, power of an amount required by the moving object 10 may be charged in consideration of an action of the user. After Step S111, the server 40 ends the processing.

In Step S112, the determination unit 472 determines whether or not the destination of the user is outdoor facilities. When the determination unit 472 determines that the destination of the user is outdoor facilities (Step S112: Yes), the server 40 proceeds to Step S113 described later. In contrast, when the determination unit 472 determines that the destination of the user is not outdoor facilities (Step S112: No), the server 40 proceeds to Step S114 described later.

In Step S113, the charging controller 474 sets the required amount of power to be charged to the battery 11 of the moving object 10 to be higher than the required power amount estimated by the estimator 471 in Step S103. Specifically, the charging controller 474 sets a power amount to be higher than a required power amount estimated by the estimator 471 based on at least one of a general average value of an amount of power used in outdoor facilities and a past power use history of the user in the outdoor facilities. As a result, the user may perform charging in consideration of use of another electric device in the outdoor facilities.

Subsequently, the charging controller 474 charges the moving object 10 by controlling the charging device 30 such that the required power amount set in Step S113 or the required power amount estimated by the estimator 471 is achieved (Step S114). After Step S114, the server 40 ends the processing.

In Step S115, the determination unit 472 determines whether or not the destination satisfies a predetermined condition based on a weather forecast acquired by the estimator 471. Here, the predetermined condition includes a temperature at which the user uses an air conditioner, for example, a temperature of 25 degrees or more. Specifically, the determination unit 472 determines whether or not the destination has a temperature of a predetermined value or more based on the weather forecast acquired by the estimator 471. When the determination unit 472 determines that the destination satisfies the predetermined condition (Step S115: Yes), the server 40 proceeds to Step S116 described later. In contrast, when the determination unit 472 determines that the destination does not satisfy the predetermined condition (Step S115: No), the server 40 proceeds to Step S113 described later.

In Step S116, the charging controller 474 sets a required amount of power to be charged to the battery 11 of the moving object 10 to be higher than the required power amount estimated by the estimator 471 as the air temperature at the destination is increased based on the weather forecast. Specifically, as the air temperature at the destination based on the weather forecast is increased by one degree from a predetermined value (25 degrees), the charging controller 474 sets the required power amount to be higher than the required power amount estimated by the estimator 471 by 5%.

Subsequently, the charging controller 474 charges the moving object 10 by controlling the charging device 30 such that the required power amount set in Step S115 is achieved (Step S117). After Step S117, the server 40 ends the processing.

In Step S118, the charging controller 474 charges the moving object 10 by controlling the charging device 30 such that the required power amount estimated by the estimator 471 is achieved. After Step S118, the server 40 ends the processing.

According to the above-described embodiment, the estimator 471 acquires a starting position where a user starts to use the moving object 10 and a destination of the user, and estimates an amount of power required by the moving object 10 from the starting position to the destination. Then, the determination unit 472 determines whether or not power of the battery 11 of the moving object 10 is consumed at the destination. Thereafter, when the determination unit 472 determines that the power of the battery 11 of the moving object 10 is consumed at the destination, the charging controller 474 sets the amount of power required by the moving object 10 at a high level, and charges the moving object 10 to the required power amount. As a result, the SOC shortage of the battery 11 of the moving object 10 may be prevented in consideration of power consumption accompanying an action of the user.

Furthermore, according to the embodiment, the determination unit 472 determines whether or not the destination satisfies a predetermined condition of a destination based on the weather forecast of the destination. Then, when the determination unit 472 determines that the destination satisfies the predetermined condition, the charging controller 474 sets the amount of power required by the moving object 10 at a high level. As a result, power of an amount required by the moving object 10 may be charged in consideration of weather (climate) at the destination of the user. Even when the user uses an air conditioner of the moving object 10 due to a high air temperature, the SOC shortage of the battery 11 of the moving object 10 may be prevented.

Furthermore, according to the embodiment, the charging controller 474 sets an amount of power required by the moving object 10 at a higher level as the temperature of the destination is increased. Even when the user heavily uses an air conditioner in accordance with the air temperature, the SOC shortage of the battery 11 of the moving object 10 may be prevented.

Furthermore, according to the embodiment, when the destination is at least one of outdoor facilities and sports facilities, the charging controller 474 sets an amount of power required by the moving object 10 at a high level. As a result, even when the user uses an air conditioner of the moving object 10 due to the body temperature increased by sports and the like, the SOC shortage of the battery 11 of the moving object 10 may be prevented. Alternatively, even when the user uses an electric device by using the battery 11 of the moving object 10 in outdoor facilities, the SOC shortage of the battery 11 of the moving object 10 may be prevented.

Furthermore, according to the embodiment, the prediction unit 473 makes a user action prediction. Then, the charging controller 474 sets a required power amount based on user action prediction predicted by the prediction unit 473. As a result, the SOC shortage of the battery 11 of the moving object 10 may be prevented in consideration of power consumption accompanying an action of the user.

Furthermore, according to the embodiment, the prediction unit 473 acquires user schedule information from the schedule information DB 46, and makes a user action prediction based on the acquired schedule information, so that the user action prediction may be made with high accuracy.

Furthermore, according to the embodiment, the determination unit 472 acquires the user biological information, and determines whether or not the biological information is within the range of the action prediction predicted by the prediction unit 473. Then, when the determination unit 472 determines that the user biological information is within the range of the action prediction, the charging controller 474 sets the amount of power required by the moving object 10 at a high level. Unnecessary charging to the moving object 10 may be prevented by determining whether or not the predicted action based on the actual schedule of the user has been performed.

Furthermore, in a charging system according to the embodiment, a "unit" may be replaced with a "circuit" or the like. For example, a controller may be replaced with a control circuit.

Furthermore, a program to be executed by a charging system according to the embodiment may be provided after being stored in a computer-readable recording medium such as a CD-ROM, a flexible disk (FD), a CD-R, a digital versatile disk (DVD), a USB medium, and a flash memory as file data in an installable format or an executable format.

Furthermore, the program to be executed by the charging system according to the embodiment may be provided by being stored in a computer connected to a network such as the Internet and downloaded via the network.

Note that, although, in the description of the flowcharts in the present specification, the context of processing between steps is clearly indicated by using expressions such as "first", "thereafter", and "subsequently", the order of processing necessary for implementing the embodiment is not uniquely determined by these expressions. That is, the order of processing in the flowcharts described in the present specification may be changed within a consistent range.

According to the present disclosure, an effect of allowing the SOC shortage of a battery of a moving object to be prevented in consideration of power consumption accompanying an action of a user is exhibited.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising
a processor configured to:
acquire a starting position where a user starts to use a moving object including a rechargeable secondary battery, and a destination of the user;
estimate a required power amount for the moving object to move from the starting position to the destination;
determine whether or not power of the secondary battery is consumed at the destination;
determine whether or not the destination is a sports facility;
acquire schedule information of the user;
acquire biological information of the user;
perform an action prediction of the user based on the schedule information of the user;
increase the required power amount to be greater than the required power amount for the moving object to move from the starting position to the destination in a case where the power of the secondary battery is to be consumed at the destination and when determining that the destination is the sports facility and that the biological information of the user is within a range of the action prediction; and
charge the moving object to the increased required power amount.

2. A charging system comprising:
a moving object including a rechargeable secondary battery; and
a server including a processor configured to:
acquire a starting position where a user starts to use the moving object, and a destination of the user;
estimate a required power amount for the moving object to move from the starting position to the destination;
determine whether or not power of the secondary battery is consumed at the destination;
determine whether or not the destination is a sports facility;
acquire schedule information of the user;
acquire biological information of the user;
perform an action prediction of the user based on the schedule information of the user;
increase the required power amount to be greater than the required power amount for the moving object to move from the starting position to the destination in a case where the power of the secondary battery is to be consumed at the destination and when determining that the destination is the sports facility and that the biological information of the user is within a range of the action prediction; and charge the moving object to the increased required power amount.

3. A non-transitory computer-readable recording medium on which an executable program is stored, the program causing a processor of a computer to execute:

acquiring a starting position where a user starts to use a moving object including a rechargeable secondary battery, and a destination of the user;

estimating a required power amount for the moving object to move from the starting position to the destination;

determining whether or not power of the secondary battery is consumed at the destination;

determining whether or not the destination is a sports facility;

acquiring schedule information of the user;

acquiring biological information of the user;

performing an action prediction of the user based on the schedule information of the user;

increasing the required power amount to be greater than the required power amount for the moving object to move from the starting position to the destination in a case where the power of the secondary battery is to be consumed at the destination and when determining that the destination is the sports facility and that the biological information of the user is within a range of the action prediction; and charging the moving object to the increased required power amount.

* * * * *